United States Patent
Mody et al.

(10) Patent No.: US 10,713,522 B2
(45) Date of Patent: *Jul. 14, 2020

(54) METHODS AND SYSTEMS FOR ANALYZING IMAGES IN CONVOLUTIONAL NEURAL NETWORKS

(71) Applicant: Texas Instruments Incorporated, Dallas, TX (US)

(72) Inventors: Mihir Narendra Mody, Bangalore (IN); Manu Mathew, Bangalore (IN); Chaitanya Satish Ghone, Pune (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,149

(22) Filed: May 1, 2019

(65) Prior Publication Data
US 2019/0258891 A1    Aug. 22, 2019

Related U.S. Application Data

(63) Continuation of application No. 16/108,237, filed on Aug. 22, 2018, now Pat. No. 10,325,173, which is a (Continued)

(51) Int. Cl.
*G06K 9/46* (2006.01)
*G06K 9/52* (2006.01)
*G06K 9/62* (2006.01)

(52) U.S. Cl.
CPC .......... *G06K 9/4628* (2013.01); *G06K 9/522* (2013.01); *G06K 9/6271* (2013.01)

(58) Field of Classification Search
CPC . G06T 7/42; G06T 7/262; G06T 2207/20056; G06K 9/4628; G06K 9/522;
(Continued)

(56) References Cited

U.S. PATENT DOCUMENTS 5,161,204 A    11/1992    Hutcheson et al.
5,274,714 A    12/1993    Hutcheson et al.
(Continued)

FOREIGN PATENT DOCUMENTS

RU    2004125168 A    1/2006
RU    2013151137 A    5/2015
WO    2016172612 A1    10/2016

OTHER PUBLICATIONS

International Search Report for PCT/US2017/065881 dated Feb. 21, 2018.

*Primary Examiner* — Daniel G Mariam
(74) *Attorney, Agent, or Firm* — Ebby Abraham; Charles A. Brill; Frank D. Cimino

(57) ABSTRACT

A method for analyzing images to generate a plurality of output features includes receiving input features of the image and performing Fourier transforms on each input feature. Kernels having coefficients of a plurality of trained features are received and on-the-fly Fourier transforms (OTF-FTs) are performed on the coefficients in the kernels. The output of each Fourier transform and each OTF-FT are multiplied together to generate a plurality of products and each of the products are added to produce one sum for each output feature. Two-dimensional inverse Fourier transforms are performed on each sum.

18 Claims, 7 Drawing Sheets

Related U.S. Application Data continuation of application No. 15/376,473, filed on Dec. 12, 2016, now Pat. No. 10,083,374.

(58) Field of Classification Search
CPC .. G06K 9/4652; G06K 9/6245; G06K 9/6271; G06F 17/14; G06F 17/141
USPC ........................................ 382/156, 276, 280
See application file for complete search history.

(56) References Cited

U.S. PATENT DOCUMENTS

| | | |
|---|---|---|
| 5,465,308 A | 11/1995 | Hutcheson et al. |
| 7,333,422 B2 | 2/2008 | Amer |
| 8,165,407 B1 | 4/2012 | Khosla et al. |
| 2007/0165906 A1 | 7/2007 | Han |
| 2016/0037071 A1 | 2/2016 | Emmett et al. |

METHODS AND SYSTEMS FOR ANALYZING IMAGES IN CONVOLUTIONAL NEURAL NETWORKS

CROSS REFERENCED TO RELATED APPLICATIONS

This application is a continuation of U.S. patent application Ser. No. 16/108,237, filed Aug. 22, 2018, which is a continuation of patent application Ser. No. 15/376,473, filed Dec. 12, 2016, both are hereby fully incorporated herein by reference.

BACKGROUND

Deep learning techniques such as convolutional neural networks (CNNs) are becoming popular for image classification, pixel labeling, path planning, and other applications with broad usage in multiple applications including automotive, industrial, drones, and robotic applications. Typical CNN architecture includes a cascade of multiple layer functions, such as convolutions, non-linearity, spatial pooling, and fully connected layers. Convolution layers consisting of two-dimensional convolutions typically constitute more than 90% of the computations required for image classification and pixel labeling.

One approach for convolution is based on processing in the frequency domain (also known as the FFT domain) using fast Fourier transform (FFT) techniques. In this technique, convolution is simplified to pointwise complex multiplication in an FFT domain. One of the problems with the FFT-based approach is that it generates a large number of frequency domain coefficients that is proportional to the dimensions of the image being analyzed rather than the size of a filter applied to the image, assuming the filter dimensions are much smaller than the image dimensions. The memory required to store the frequency domain coefficients is very high and beyond the typical size of on-chip memory of most computers and/or processing chips, making this technique impractical for most hardware.

SUMMARY

A method for analyzing images to generate a plurality of output features includes receiving input features of the image and performing Fourier transforms on each input feature. Kernels having coefficients of a plurality of trained features are received and on-the-fly Fourier transforms (OTF-FTs) are performed on the coefficients in the kernels. The output of each Fourier transform and each OTF-FT are multiplied together to generate a plurality of products and each of the products are added to produce one sum for each output feature. Two-dimensional inverse Fourier transforms are performed on each sum.

DETAILED DESCRIPTION

Image identification/analysis systems identify and/or classify images by implementing deep learning techniques such as convolutional neural networks (CNNs). Advances in deep learning techniques, such as CNNs, are available in part because of advances in computation power along with low-cost and powerful cameras. A typical CNN architecture includes multiple layers of two-dimensional convolutions, which typically constitute more than 90% of the total computations necessary for image analysis, such as classification, pixel labeling, and other functions. CNNs and imaging systems are described herein that perform convolution in the frequency domain using fast Fourier transforms (FFTs) with reduced complexity and reduced memory usage.

Figure 1:
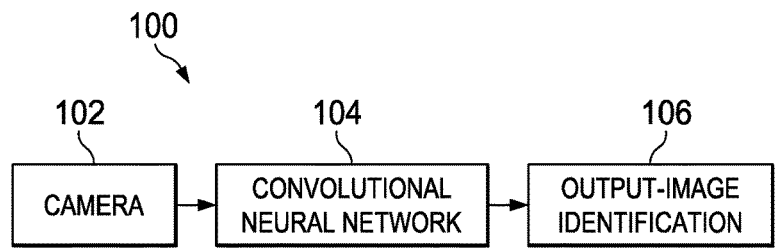
FIG. 1 is a block diagram of an imaging system that implements a convolutional neural network (CNN).

FIG. 1 is a block diagram of an imaging system 100 that implements a CNN. The imaging system 100 includes a camera 102 that captures images. The camera 102 outputs digital image data representative of the captured images to a CNN 104 that performs image analysis techniques, such as classification described herein. The disclosure described herein is focused on performing convolution in a frequency domain (sometimes referred to as the FFT domain) using FFTs. Accordingly, the CNN 104 implemented in the imaging system 100 may perform more tasks than described herein. The CNN 104 generates data or output features based on the analysis of images received from the camera 102. The data is transferred to an output device 106 (or output-image identification device 106) that provides a notification for given image analysis, wherein the notification may include identification of objects in the image. For example, the output device 106 may be implemented with software, a voice system, or a display that translates the data generated by the CNN 104 to data that is readable by a computer or output to a speaker or a display for given image analysis.

Figure 2:
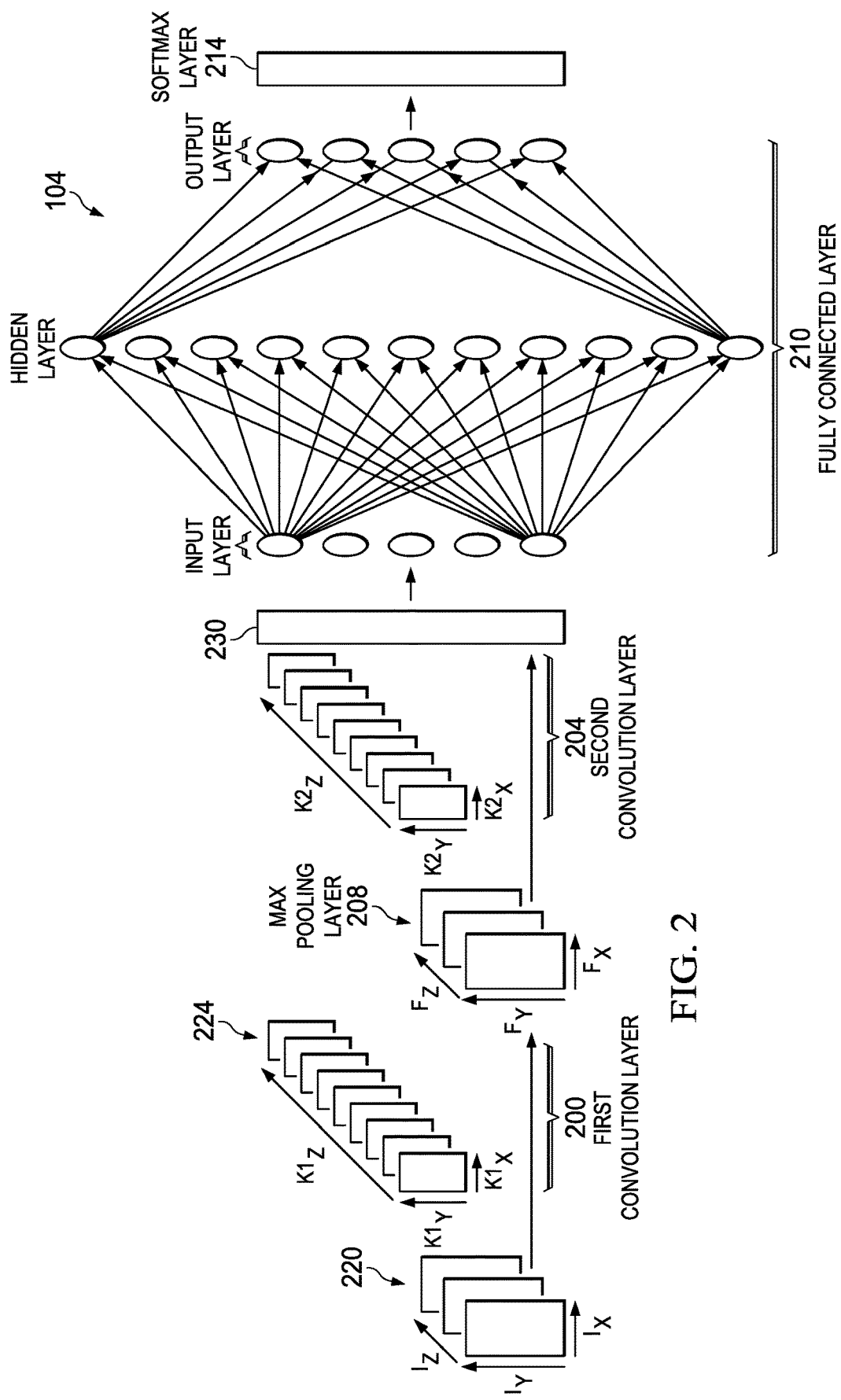
FIG. 2 is a block diagram of a CNN with two convolution layers and a fully connected layer followed by a softmax layer.

FIG. 2 is a block diagram of an example of the CNN 104 of FIG. 1. The CNN 104 includes two convolution layers, referred to as a first convolution layer 200 and a second convolution layer 204. The layers described herein perform functions that may be performed by modules or the like in a hardware or computer system. Max pooling is performed by a max pooling layer 208 located between the first and second convolution layers 200 and 204. The CNN 104 includes a fully connected layer 210 wherein all the neurons are interconnected in the fully connected layer 210. A softmax layer 214 follows the fully connected layer 210 and provides a final score or probability for a given object class. The object class identifies an object in the image or provides the likelihood as to the identification of an object in the image. For example, the object class may be a car or a cat and the softmax layer 214 may provide a probability that the object in the image is actually a car or a cat. The CNN 104 described in FIG. 1 is an example of one of a plurality of CNNs that may implement the improvements described herein. CNNs implemented in practice may vary in many ways including the number of layers, the type of layers, the breadth of each layer, and the order of layers. The methods and apparatuses described herein are applicable for variations of CNNs in computations of two-dimensional convolution.

The CNN 104 receives input features 220 (sometimes referred to as input feature vectors) that are representative of an image that is to be analyzed. The features 220 may include pixel values of an image generated by the camera 102, FIG. 1. The features 220 in the example of FIG. 2 are pixel values in individual color domains. Accordingly, in many examples, the features 220 have three layers or planes representing the red, green, and blue color domains. The features 220 are represented as having dimensions $I_X$, $I_Y$, and $I_Z$, wherein $I_Z$ is equal to the three color domains. The features 220 are convolved at the first convolution layer 200 with a set of pre-trained receptive filter coefficients 224 that are also know as field kernels. The coefficients 224 are obtained during training processes a priori (offline) and represent knowledge of objects of interest used for analysis as is known in the art. The convolution layer 200 may be followed by a non-linear operation layer (not shown) that is typically a rectified linear unit (ReLU) or similar function.

Max pooling is applied to the results of the first convolution layer 200 at the max pooling layer 208. The max pooling layer 208 introduces slight translation invariance and reduces the feature vector size resulting from the first convolution layer 200. In some examples, the max pooling layer 208 filters certain blocks in the input by selecting the maximum values in the blocks and discarding the remaining values. The max pooling layer 208 may operate independently on every layer of the input and resizes the input. In some examples, a pooling layer with filters having sizes of two by two is applied with a stride of two downsamples at every depth slice in the input by two along both width and height, discarding 75% of the values resulting from the convolution layer 200. Some examples of the CNN 104 do not include the max pooling layer 208.

A second convolution is performed by the second convolution layer 204 after the max pooling layer 208. The result of the second convolution is sometimes referred to as a learned feature vector or an output feature 230. The learned feature vector 230 is input to the fully connected layer 210 for classification. The softmax layer 214 normalizes the results generated by the fully connected layer 210. For example, the softmax layer 214 maps the vectors to a probability of a given output, which in the example of FIG. 2 includes classification or identification of an image. In the example described above, the softmax layer 214 may provide a probability that the image received from the camera 102, FIG. 1, is a car and a probability that the image is a cat. There are multiple network topologies, such as LeNet5[3], AlexNet[4], Sermanet[5], that have multiple convolution steps and fully connected stages which result in large computational complexity. The devices and methods described herein overcome or reduce the complexity issues.

Two-dimensional convolution in the first convolution layer 200 and the second convolution layer 204 uses tremendous resources, which the devices and methods described herein reduce or alleviate. Two-dimensional convolution is defined by equation (1) as follows:

$$\text{Output}(m,n) = \Sigma_i \Sigma_j (\text{Input}(m-i, n-j) \times \text{weight}(i,j)) \quad \text{Equation (1)}$$

where m, n, i, and j are indices of values in a given array; the indices i,j have values in the range of 0 to the filter tap, which is also known as the training parameters, kernel, filter coefficients 224, and other terms; the indices m,n have values in the range of 0 to the image height/width; the "input" is the input features; and the "weight" is the filter coefficients obtained during training.

Figure 3:
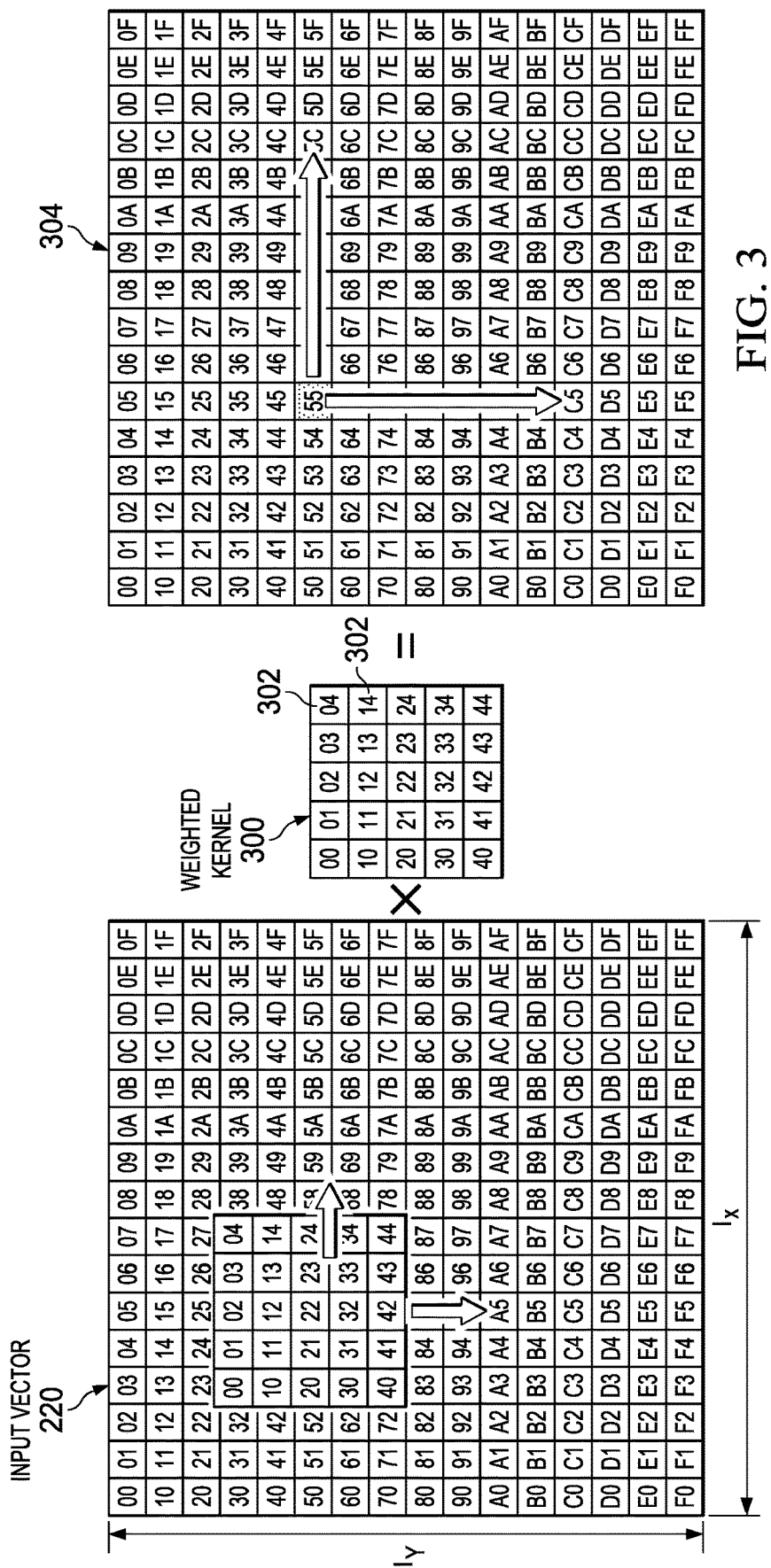
FIG. 3 is a block diagram showing two-dimensional convolution of an input feature vector.

FIG. 3 is a block diagram showing two-dimensional convolution of an example of one of the input features 220 of FIG. 2. The input feature 220 has a size (horizontal× vertical) of 16×16 and can vary based on image dimension (e.g. 1920×1080). The input feature 220 is convolved with a weighted kernel 300 that has a plurality of weighted coefficients 302. In the examples of FIG. 3, the weighted kernel 300 has a size of 5×5, meaning it has twenty-five weighted coefficients 302 and can vary based on the CNN (e.g. 3×3, 7×7, 9×9, etc.). The convolution produces an output feature vector 304 having a size of 16×16, which assumes zero padding along the border. In direct convolution, the two-dimensional convolution is implemented per equation (1). In direct convolution, an efficient solution takes account of two-dimensional spatial locality for fetching data from external memory to internal memory. In CNN architectures, there are a large number of two-dimensional convolutions for each layer, which is equal to the number of input features ($N_i$) multiplied by the number of output features ($N_o$). It is not uncommon for a single convolution operation to be required to store 100 Mbytes of filter coefficients for these convolutions, which overwhelms most computational systems.

Figure 4:
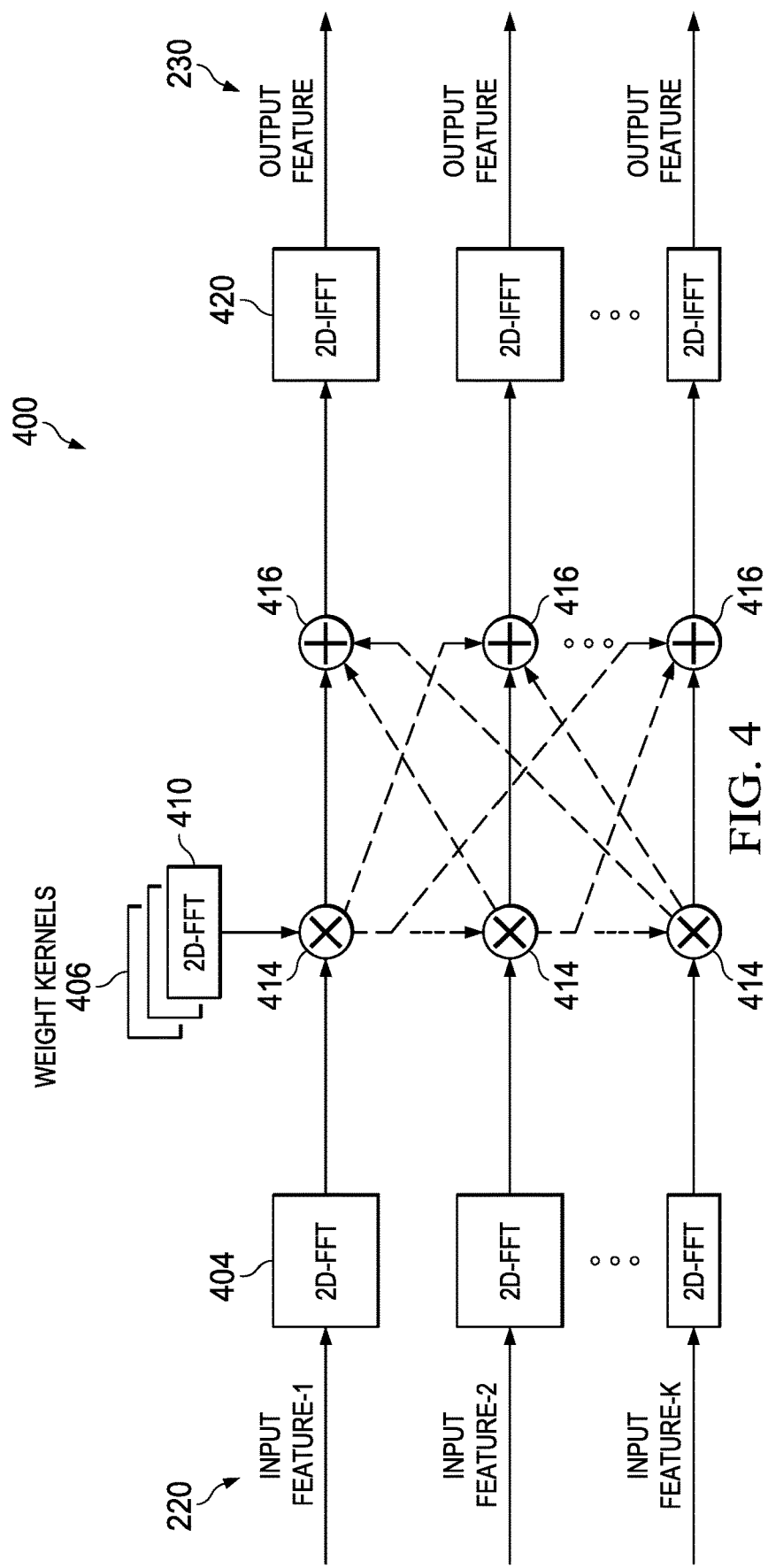
FIG. 4 is a diagram showing an example of image analysis in a convolutional neural network using a fast Fourier transform (FFT) based approach.

FIG. 4 is a diagram 400 showing convolution in neural networks using a Fourier transform (FT) based approach, which is described herein being implemented as a fast Fourier transform (FFT) based approach. The FFT approach reduces the complexity of convolution when categorizing images in terms of multiplication and addition operations. As per signal processing theory, a convolution operation in the time domain becomes a pointwise complex multiplication operation in the frequency domain, which is referred to herein as the FT domain or the FFT domain. In the FFT approach, input features 220 are received and have two-dimensional FFTs 404 applied to them, which yields two-dimensional complex arrays (not shown in FIG. 4) of identical dimension (height/width) as the input features 220. Weighted kernel coefficients 406 (also known as trained features) have a two-dimensional FFT 410 performed on them, which also yields two-dimensional arrays of complex coefficients having the same dimensions as the input features 220 rather than the dimensions of the kernel coefficients 406. This is to provide for pointwise multiplication, where the dimensions of both the input features 220 and the kernel coefficients 406 have to be identical. Assuming the dimensions of the kernel coefficients 406 are typically small compared to the dimension of the input features 220, the kernel coefficients 406 are zero padded to make the dimension of the input features 220 equal to the dimensions of the kernel coefficients 406. In contrast, when the input features 220 are smaller than the kernel coefficients 406, the zero padding is applied to the input features 220, so the dimensions of the input features 220 match the dimensions of the kernel coefficients 406. Typically, the FFT 410 is performed on the weighted kernel coefficients 406 offline during training. The coefficients need to be stored, which again creates a tremendous number of coefficients and overwhelms the memory of most computational systems.

The results generated by the FFTs 404 and 410 are multiplied together by way of complex multiplication 414. All the multiplication results are added together by way of complex addition 416. The complex sums generated by the complex addition 416 have inverse Fourier transforms (IFTs) applied to them, which are implemented in the example of FIG. 4 as inverse fast Fourier transforms (IFFTs) 420. The results of the IFFTs 420 are the output features 230, which become input features for the next layer. In situations where the 2D-IFFTs 420 are performed prior to the operations of the fully connected layer 210, FIG. 2, the results of the IFFTs 420 are referred to as learned feature vectors. The primary advantage of the FFT approach applied to CNNs is that the 2D-FFTs 404 are computed once per input feature, while IFFTs 420 need to be computed only once per output feature, amortizing the cost of the 2D-FFTs 404 and the IFFTs 420. In some examples, the FFT approach described herein provides a complexity reduction of up to 40% depending on the CNN network structure.

The FFT based approach for convolution described in FIG. 4 is impractical in many situations due to growth in the memory size required to store the weighted kernel coefficients 406. The methods and devices described herein provide methods for performing convolution in the FFT domain that reduce the size of the weighted kernel coefficients 406, so they are identical to the space domain for direct convolution. The methods described herein include performing on-the-fly Fourier transforms (OTF-FTs) on the weighted kernel coefficients 406 to prevent explosive growth in the size of storage. More specifically, the OTF-FTs enable frequency domain or FFT domain storage, which is much less than the storage required in the case of offline FFTs. Some examples of the methods described herein perform FFTs of the input features 220, pruning of the outputs of the FFTs 404, pointwise multiplication with the output of the OTF-FT, and expanding the results of the complex addition 416. The methods disclosed herein operate at a rate that is typically four to eight times faster than traditional FFT based approaches. The methods described herein may be applied to time/space domain analysis in applications other than two-dimensional image processing. In some examples, the devices and methods described herein are applicable to sequences of images, such as video.

Figure 5:
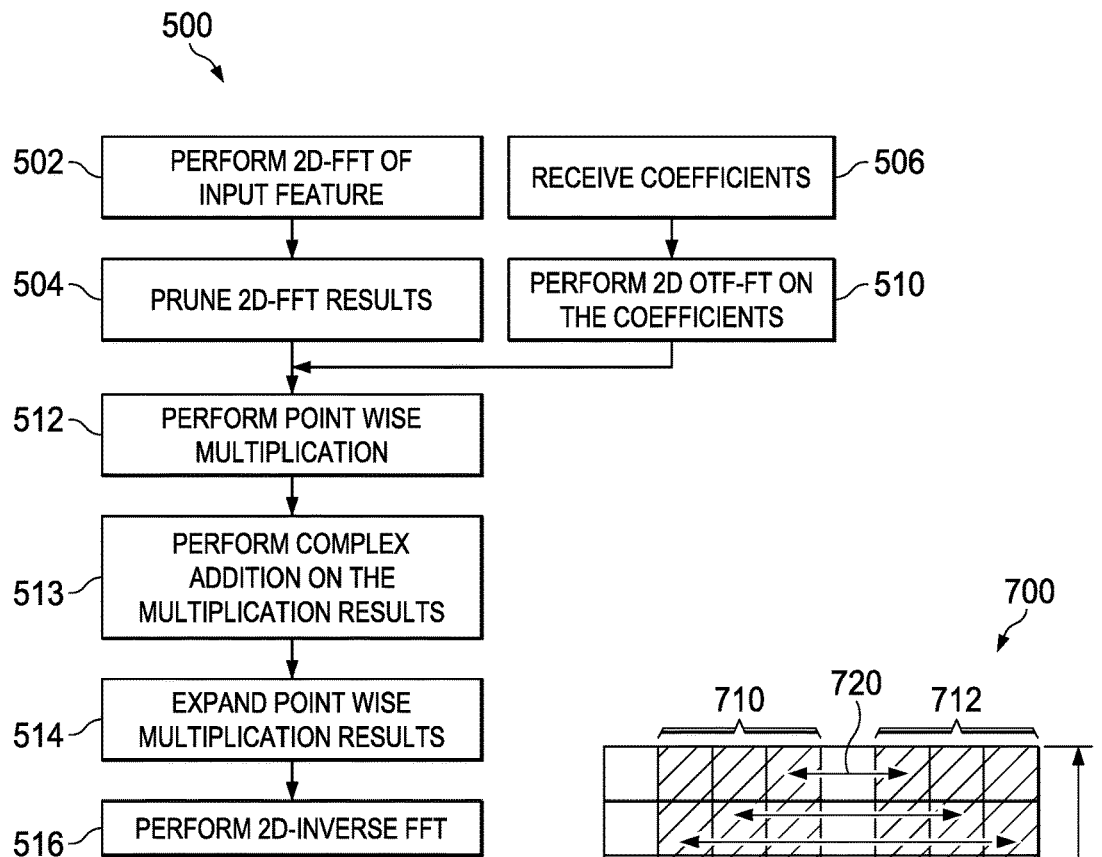
FIG. 5 is a flowchart that summarily describes an example of the convolution methods disclosed herein.

FIG. 5 is a flowchart 500 that summarily describes examples of the convolution methods performed in the FFT domain disclosed herein. In step 502, the two-dimensional FFT is performed on an input feature. This may be similar or identical to the 2D-FFTs 404 of FIG. 4. In step 504, the results of the two-dimensional FFTs are pruned or reduced as described in greater detail below. In step 506, the weighted kernel coefficients 406 are received from an offline training procedure. An OTF-FT is performed on the coefficients at step 510. In step 512, pointwise multiplication is performed between the pruned results from step 504 and the results from the OTF-FT from step 510. The results of the pointwise multiplication of step 512 are added by way of complex addition in step 513. The results of the complex addition are expanded in step 514 as described in greater detail below. In step 516, a two-dimensional inverse FFT is performed on the results of step 514 to yield the output features or the learned feature vectors.

Figure 6:
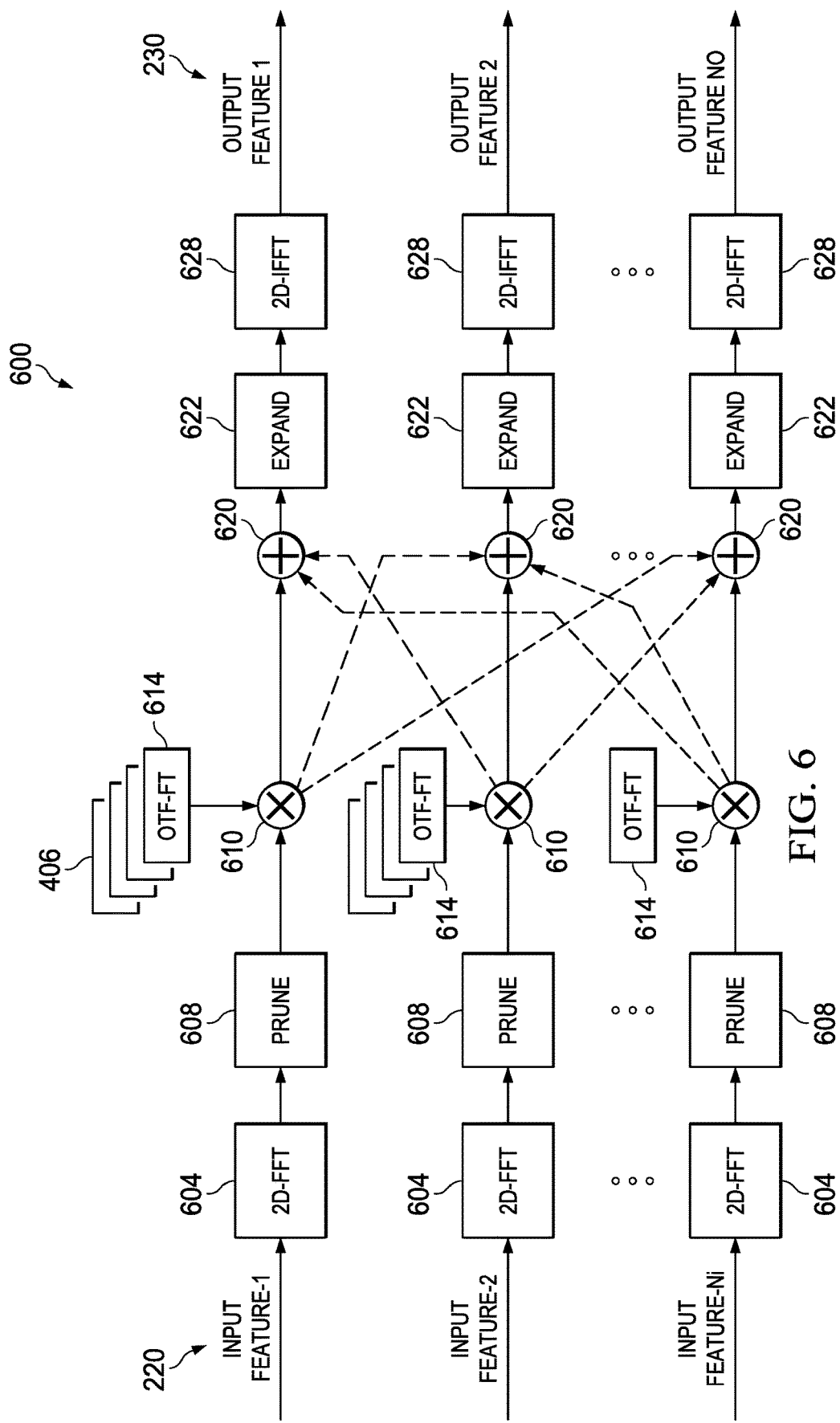
FIG. 6 is a diagram describing an example of the image analysis of FIG. 4 in greater detail.

FIG. 6 is a chart 600 describing an example of the convolution method in greater detail. The example of FIG. 6 has $N_i$ input features 220, which are shown as input feature 1, input feature 2, and input feature $N_i$. The example of FIG. 6 has $N_o$ output features 230, which are shown as output feature 1, output feature 2, and output feature $N_o$. A plurality of weighted kernel coefficients 406 are also received as inputs from offline training as is known in the art. The kernel coefficients 406 are sometimes referred to as coefficients of trained features. The number of kernel coefficients 406 is equal to the product of $N_i$ and $N_o$. The kernel coefficients 406 are referred to as being in a spatial domain as there are a plurality of two-dimensional arrays of kernel coefficients 406. The chart 600 is described as performing processes, which may be implemented as modules in a computer system.

In the example of FIG. 6, the input features 220 are two-dimensional images or color domains of two-dimensional images. In other examples, the input features 220 are output features 230 from a previous layer. Each of the input features 220 has a 2D-FT applied to it. In the examples described herein the 2D-FTs are implemented as 2D-FFTs 604. The results of each of the 2D-FFTs 604 are symmetric, so they can be pruned in a pruning processes 608 as described in greater detail below. The results of the pruning processes 608 are input to complex multiplication processes 610. The kernel coefficients 406 have OTF-FTs 614 applied to them. The OTF-FTs 614 alleviates the need to store a vast amount of coefficients such as when the kernel coefficients 406 had FTs applied to them in an earlier process. The storage requirements for the kernel coefficients 406 are identical to spatial domain direct convolution storage requirements because spatial domain kernel coefficients are being stored. The results of the OTF-FTs 614 are input to the complex multiplication processes 610 where pointwise complex multiplication is performed on the results of the OTF-FTs 614 and the results of the pruning processes 608. Each of the input features 220 has the processes described herein applied for their contribution to each of the output features 230, resulting in the product of $N_i$ and $N_o$ convolutions. Each convolution is a pointwise complex multiplication having dimensions of the input feature (assuming the dimensions of the input features 220 are larger than the dimensions of the kernel coefficients 406 and vice versa) with the output from the OTF-FT 614 of the kernel coefficients 406.

The results of the complex multiplication processes 610 are added together by complex addition processes 620. There are $N_i$ complex addition processes 620, one for each of the output features 230. The results of the complex addition processes 620 are expanded as described below by expansion processes 622. In summary, the expansion processes 622 are performed based on the symmetric nature of the FFT. Once expanded, each feature has a two-dimensional inverse Fourier transform applied, which is implemented as two-dimensional inverse fast Fourier transforms (2D-IFFT) applied by 2D-IFFT processes 628. The convolution method of FIG. 6 achieves convolution in the frequency or FFT domain with spatial domain storage of weighted kernel coefficients 406 and avoids large size of frequency domain storage weighted kernel coefficients 406 as with conventional FFT processes.

Figure 7:
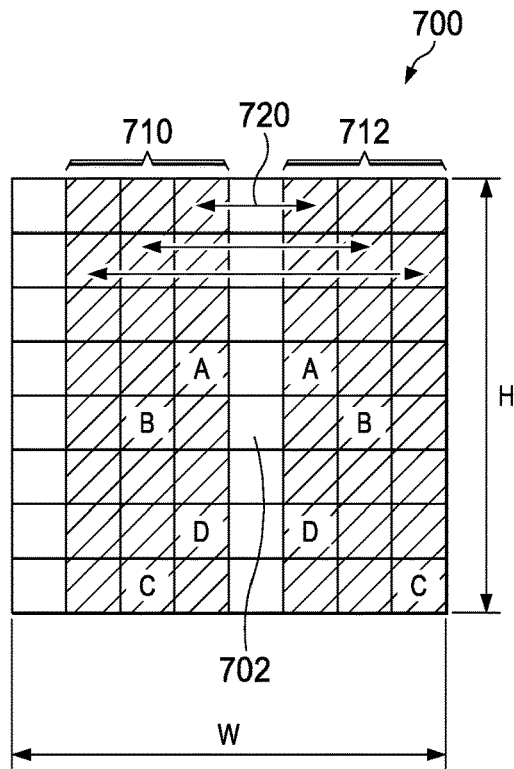
FIG. 7 is a spatial two-dimensional array describing the pruning process and the expansion processes of FIG. 6

FIG. 7 is a spatial two-dimensional array 700 describing the pruning process 608 and the expansion processes 622 of FIG. 6. The array 700 shows the two-dimensional (height H and width W) results of the Fourier transform (the 2D-FFTs 604 or the OTF-FTs 614). The results extend in a vertical direction for the height H and a horizontal direction for the width W, wherein each box represents a complex number resulting from the Fourier transform. A point 702 is the subject of the following description. The shaded portions 710 and 712 are identical due to symmetry in the Fourier transforms with arrows 720 representing columns having matching values. Lettered blocks are examples of matching complex numbers. For example, the complex numbers represented by the letters A, B, C, and D are representative of the locations of matching complex numbers.

The pruning process 608 deletes the coefficients in the shaded portion 712. For example, for the array 700 with input feature dimensions of height of 256 and width of 256, the pruning process yields an array having a width W of 129 (half the original width plus one) in the width direction and 256 in height H. Accordingly, the number of coefficients multiplied by the complex multiplication processes 610 originating from the input features 220 with the results of the OTF-FTs 614 are reduced to almost half of their original sizes.

Figure 8:
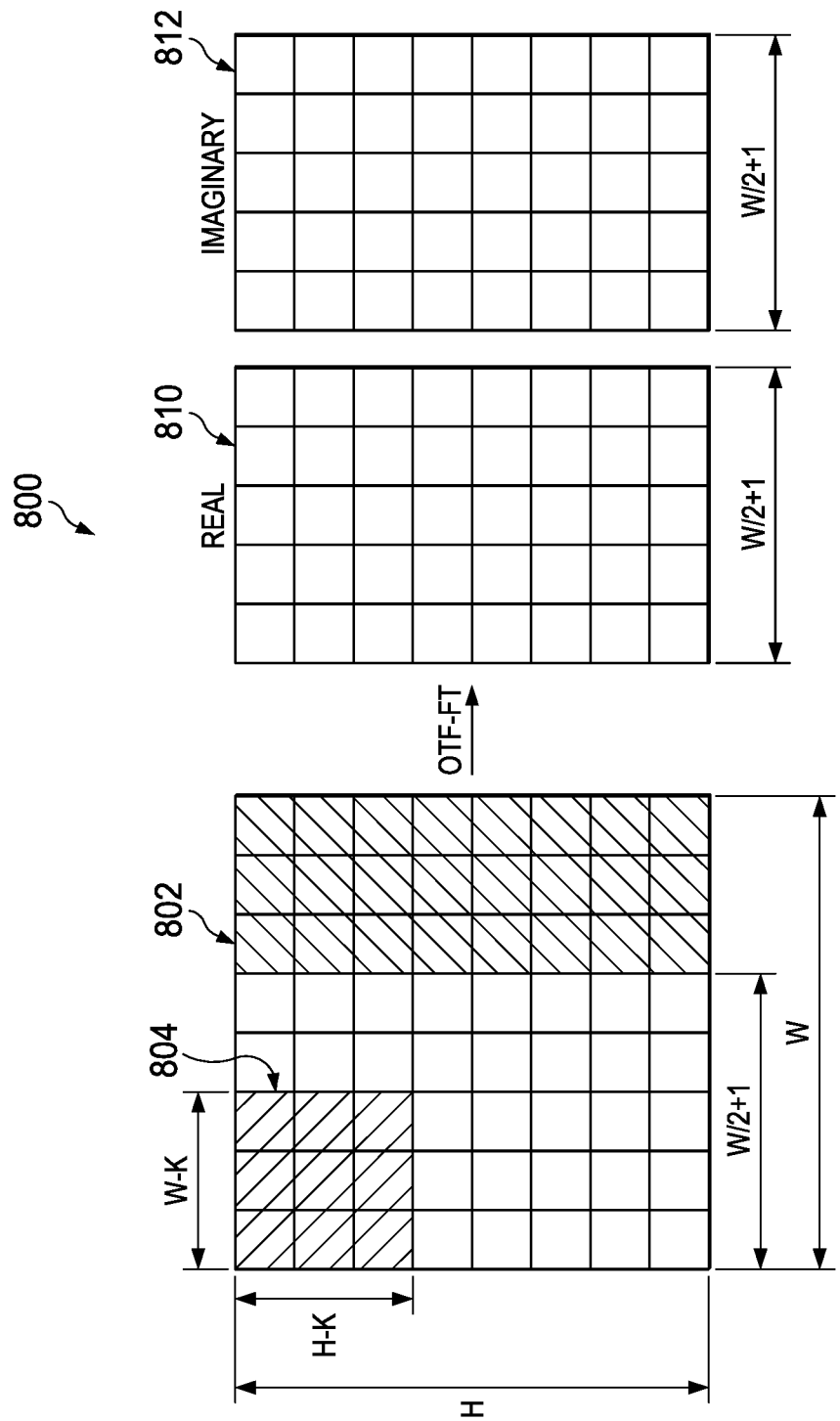
FIG. 8 is a data flow diagram showing an on-the-fly Fourier transform yielding imaginary and real components.

FIG. 8 is a data flow diagram 800 showing the input and output for the OTF-FT 614 of FIG. 6. A two-dimensional array of coefficients 802 having a height H and a width W has a spatial domain kernel 804 input having a height H-K and a width W-K and zero padding to match size (height and width) of the input feature. Due to symmetry and pruning process described above, the OTF-FT 614, FIG. 6, is processed with a reduced width of W/2+1 as described above. This means the OTF-FT 614 needs to be calculated for H×(W/2+1), which reduces the processing and storage requirements by almost half. The results of the OTF-FT 614 yield complex numbers, which are two sets of coefficients, a real set of coefficients 810 and an imaginary set of coefficients 812. Both sets of coefficients 810 and 812 are arranged in arrays that are H high by W/2+1 wide.

Figure 9:
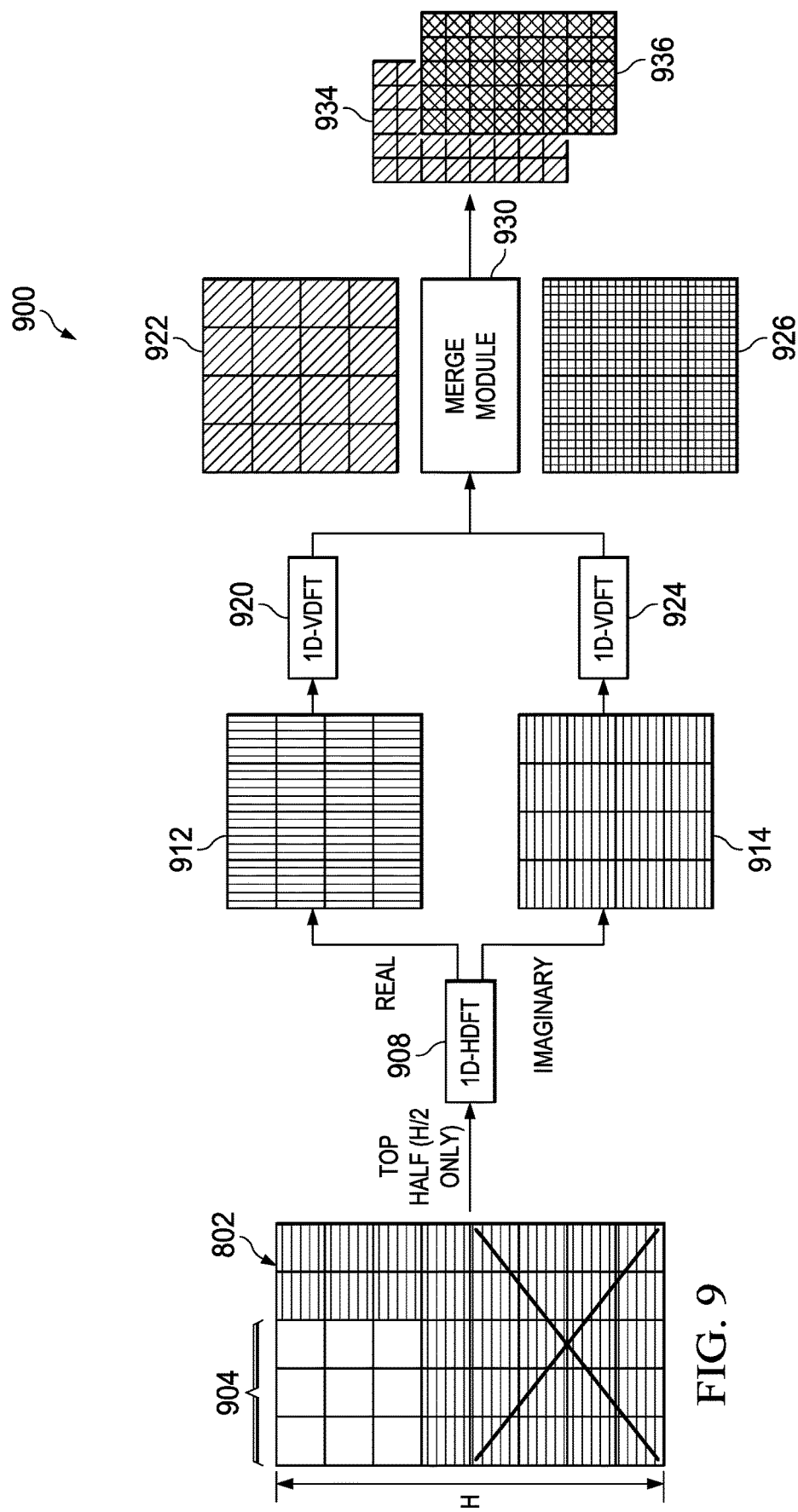
FIG. 9 is a chart showing a detailed process for performing the on-the-fly Fourier transform of FIG. 8.

FIG. 9 is a diagram 900 showing the OTF-FT process in detail. In a first step, the pruned array 802 of kernel coefficients is split so only the top half is processed. In other examples, only the bottom half is processed. The splitting forms a split array 904. The split array 904, which is the top half, is processed by a one-dimensional horizontal direct Fourier transform (1D-HDFT) 908. The 1D-HDFT 908 takes advantage of zero weight and real values in the split array 904 for efficiency. DC frequency calculations are removed, which reduces the number of multiplications required in the 1D-HDFT 908. The results of the 1D-HDFT 908 are split into a real component 912 and an imaginary component 914.

The real component 912 is processed by a one-dimensional vertical direct Fourier transform (1D-VDFT) 920 to yield results in a first array 922 of complex numbers. The imaginary component 914 is processed by a 1D-VDFT 924 to yield results in a second array 926 of complex numbers. The 1D-VDFTs 920 and 924 rely on zero weight in the kernel and simplification of the DC frequency calculations to reduce the number of multiplication steps required to generate the results in the first and second arrays 922 and 926. A merge operation 930 merges the first array 922 and the second array 926 using complex addition of both arrays and extends both planes in the vertical direction due to the symmetric property to yield the final results. The final results are a real plane 934 and an imaginary plane 936 each having dimensions of the arrays 810 and 812 of FIG. 8. The arrays are processed per FIG. 6.

The convolution and other operations described herein may be performed in software, hardware, firmware processors, microprocessors, ASICs, DSPs, computer-readable media, etc or any other means or devices as known by those skilled in the art. The operations described herein improve image identification and other processes that involve convolution. When applied to computer programs, the processes described herein significantly improve the operation of the computer by enabling convolution and image analysis in the FFT domain without the creation of an excessive number of coefficients that overwhelms the computer. It is noted that some of the processes have been described herein as using FFTs, these processes may be performed using standard Fourier Transforms. The layers described herein perform functions that may be performed by modules or the like in a hardware or computer system.

Although illustrative embodiments have been shown and described by way of example, a wide range of alternative embodiments is possible within the scope of the foregoing disclosure.

What is claimed is:

1. A system comprising:
    a Fourier transform (FT) system module in a convolutional neural network configured to generate a transformed input feature by performing a two-dimensional FT on an input feature of a received image;
    an on-the-fly Fourier transform (OTF-FT) system module in the convolutional neural network configured to:
        receive weighted kernel coefficients;
        generate transformed weighted kernel coefficients by performing a OTF-FT on the weighted kernel coefficients; and
    a multiplication system module in the convolutional neural network coupled to the FT system module and the OFT-FT system module, the multiplication system module configured to perform multiplication on the transformed input feature and the transformed weighted kernel coefficients.

2. The system of claim 1, further comprising pruning system modules for reducing the number of transformed weighted kernel coefficients generated by the OTF-FTFT system module.

3. The system of claim 2, further comprising expansion system modules for expanding the coefficients generated by the pruning system module.

4. The system of claim 1, wherein the input feature of the image is a color plane of the image.

5. The system of claim 1, wherein the OTF-FT system module comprises:
    a system module for performing a one-dimensional horizontal direct Fourier transform (1D-HDFT); and
    a system module for performing a one-dimensional vertical direct Fourier transform (ID-VDFT) on the result of the 1D-HDFT.

6. The system of claim 1, wherein the OTF-FT comprises:
    a first system module for performing a one-dimensional horizontal direct Fourier transform (1D-HDFT) on one half of the coefficients in the kernel;
    a second system module for splitting the results of the 1D-HDFT into a real component and an imaginary component;
    a third system module for performing a one-dimensional vertical direct Fourier transform (ID-VDFT) on the real component;
    a fourth system module for performing a one-dimensional vertical direct Fourier transform (ID-VDFT) on the imaginary component; and
    a fifth system module for merging the real component and the imaginary component.

7. The system of claim 6, further comprising a sixth system module for expanding the results of the merging to generate an array equal in size to the kernel.

8. The system of claim 1, wherein the multiplication is pointwise multiplication.

9. The system of claim 1, further comprising a system module for pruning the transformed input feature.

10. The system of claim 1, further comprising an addition system module configured to perform addition on the multiplied transformed input feature and the multiplied transformed weighted kernel coefficients.

11. A method comprising:
    receiving an image, the image comprising an input feature;

performing, by a convolutional neural network, a Fourier transform (FT) on the input feature to generate a transformed input feature;

receiving, by the convolutional neural network, weighted kernel coefficients;

performing, by the convolutional neural network, an on-the-fly Fourier transform (OTF-FT) on the weighted kernel coefficients to generate transformed weighted kernel coefficients; and multiplying, by the convolutional neural network, the transformed input feature and the transformed weighted kernel coefficients.

12. The method of claim 11, wherein the input feature is the color plane of the image.

13. The method of claim 11, further comprising pruning the transformed input feature.

14. The method of claim 11, wherein performing the OTF-FTs comprises:

performing a one-dimensional horizontal direct Fourier transform (1D-HDFT); and performing a one-dimensional vertical direct Fourier transform (ID-VDFT) on the result of the 1D-HDFT.

15. The method of claim 11, wherein performing OTF-FTs comprises:

performing a one-dimensional horizontal direct Fourier transform (1D-HDFT) on a portion of the weighted kernel coefficients;

splitting the results of the 1D-HDFT into a real component and an imaginary component;

performing a one-dimensional vertical direct Fourier transform (ID-VDFT) on the real component;

performing a one-dimensional vertical direct Fourier transform (ID-VDFT) on the imaginary component; and merging the real component and the imaginary component.

16. The method of claim 15, further comprising expanding the results of the merging to generate an array equal in size to the weighted kernel coefficients.

17. The method of claim 15, further comprising pruning the weighted kernel coefficients prior to performing the 1D-HDFT.

18. The method of claim 11, wherein the multiplication is pointwise multiplication.

* * * * *